C. F. PEARSON.
GREASE CATCHING DEVICE FOR AUTOMOBILES.
APPLICATION FILED FEB. 19, 1917.
1,273,918.
Patented July 30, 1918.
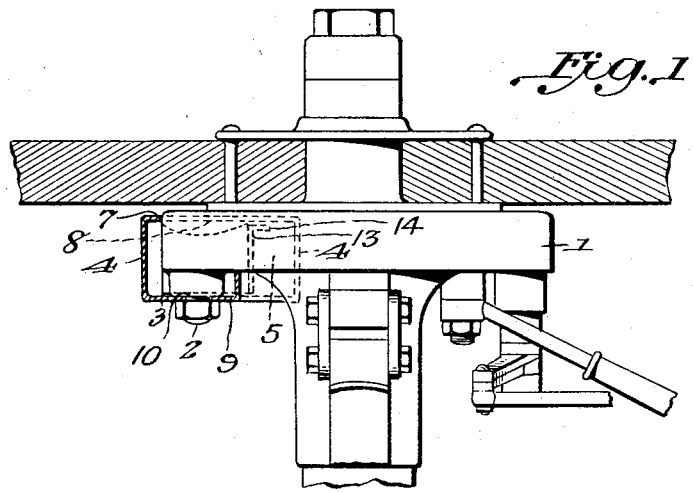
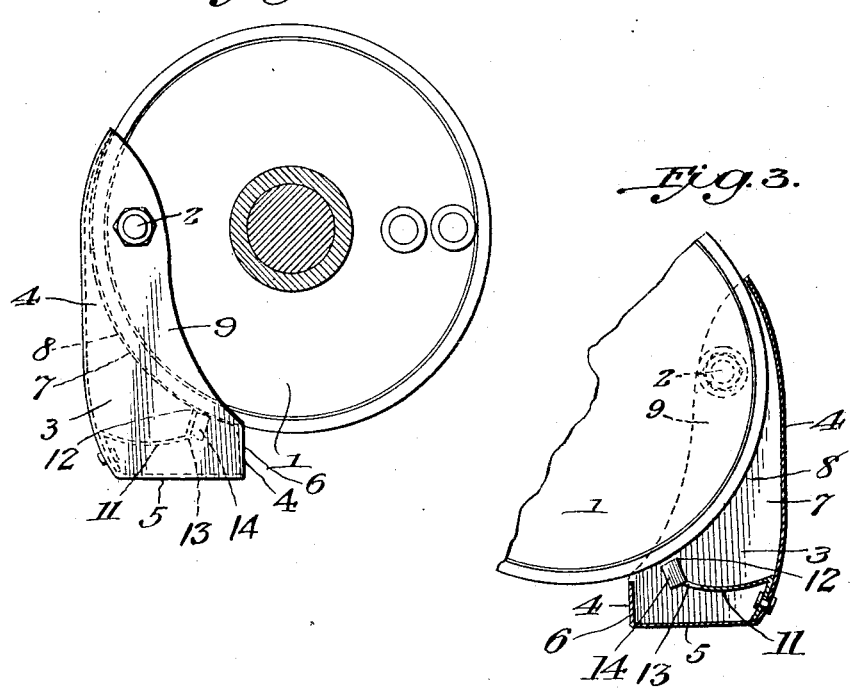
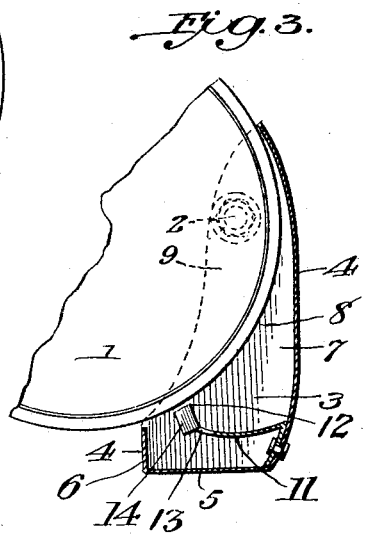
Inventor:
Coleman Ferrell Pearson.

UNITED STATES PATENT OFFICE.

COLEMAN FERRELL PEARSON, OF MONTGOMERY, ALABAMA.

GREASE-CATCHING DEVICE FOR AUTOMOBILES.

1,273,918.  Specification of Letters Patent.  Patented July 30, 1918.

Application filed February 19, 1917. Serial No. 149,703.

*To all whom it may concern:*

Be it known that I, COLEMAN FERRELL PEARSON, a citizen of the United States, residing at Montgomery, in the State of Alabama, have invented certain new and useful Improvements in Grease-Catching Devices for Automobiles, of which the following is a specification.

This invention has reference to grease catching devices for automobiles and is an improvement on my application Serial Number 124,746, the improvement being that this application specifies that a box without an outlet be used in connection with a scraping blade, whereas my former application specified that a pan with an outlet be used in connection with a scraping blade. The box in this invention is to retain the grease, whereas the pan in the former application had an outlet to permit the grease to flow out. The object of this invention is to provide a simple and readily attached grease catching device especially intended for application to the rear axle brake-drum of a Ford automobile.

A further object of this invention is to provide a grease catching device, having a blade or scraper so arranged within as to hold the free end of the latter into such close relation to the periphery of the brake drum to which it is applied, as to effectually remove any grease therefrom which may have accumulated upon it.

The invention comprises a sheet metal box with four sides, a bottom and a blade. The blade in this invention is of the same construction and pattern as is the one used in my former application except that in this one there is a marginal ear bent downward which will be referred to later on. One of the sides of this device contains an opening near its top by means of which it may be readily attached to the rear axle brake-shoe bolt of a Ford automobile. The scraping blade is so related to the brake-shoe drum of the automobile to which it is attached as to cause any grease which may escape from the drum to be directed into the box and retained by it. By such means, grease drippings escaping from the brake-shoe-drum are prevented from reaching the rear wheel, and thus from soiling it, and also from reaching the rubber tire, grease being injurious to rubber.

The invention will be best understood from a consideration of the following detailed description taken in connection with the accompanying drawings forming a part of this specification, with the further understanding that while the drawings show a practical form of the invention, the latter is not confined to any strict conformity with the showing of the drawings, but may be changed and modified as long as such changes and modifications come within the scope of the appended claim.

In the drawings:—

Figure 1 is a plan view of the brake-shoe drum and adjacent parts of a vehicle with grease-catching box attached, looking from above downward.

Fig. 2 is a side elevation with axle in cross section, and looking toward the corresponding wheel, the latter being omitted.

Fig. 3 is a side elevation with a cross section of the grease catching device or box, showing the side 7 next to the corresponding wheel, the latter being omitted; also showing an arrangement of the grease catching blade and an arrangement of the front side of the box.

While the invention is particularly designed for use with a Ford automobile it may be employed with other makes of automobiles where like conditions prevail, and with such changes as to shape as may be needed to adapt the device to such other makes of automobiles.

In the Ford automobile there is provided a brake drum 1 which is shown in the drawings without any attempt to illustrate specific features thereof. Such brake drum which is carried by the rear axle is provided with a bolt 2 for the rear axle brake-shoe.

The invention comprises a box 3 which may be conveniently made of sheet metal, in most part of two pieces stamped out and soldered together or otherwise formed. The box has four upstanding sides 4 and a bottom 5. The box is so arranged that the front side 6 underrides the drum 1, as does also a part of side 7 which is the side next to the corresponding wheel. The front edge 8 of the side 7 is cut circularly so as to fit snugly up to the brake-drum 1 but not necessarily in contact with it. At the upper part of the side 9 is an opening 10 which constitutes a means of suspension for the box 3, permitting the application of the side 9 to the bolt 2 with the nut of the bolt clamping the side in place. Within the box 3 and riveted fast to the back thereof is a blade 11 so positioned that the upper or free end 12 is in close relation to the periphery of the drum 1 so that any grease escaping from the drum, instead of being thrown off by centrifugal force, will be caught by the blade 11 and especially by its free end 12 which is bent upwardly to serve as a catch member for the grease. As soon as the grease leaves the revolving drum and is caught by the blade 11 it gravitates to the bottom of the box and is retained therein.

From either side of the blade 11 and beginning at the point 13 where it is upwardly bent and extending to the free end 12 there is a projecting marginal edge 14 bent downward in order to insure the gravitation into the box of any grease which may have worked away from the free end of the blade 12. It may be made about one half an inch long.

In order that an idea may be obtained as to the general proportions of the device it may be stated that from top to bottom it may be about six or eight inches according to the size you wish to make it. At the top it is narrow, about one inch from front to rear, or may taper to a point at the top, while at the bottom from front to rear it may be about four or five inches, and with the front side 6 extending upward about one and a half inches it will hold about four ounces of grease.

What is claimed is:—

A box for catching and retaining the drippings of grease from the brake-drum of an automobile, said box being adapted by its formation to retain the grease, thereby keeping it away from the wheel and tire adjacent to the brake-drum from which it is applied, and also provided with an opening adapted to be attached to a bolt present on the brake-drum of a Ford automobile, and also provided with a blade for engaging grease accumulating on the periphery of the drum and directing it into the box.

COLEMAN FERRELL PEARSON.

Copies of this patent may be obtained for five cents each, by addressing the "Commissioner of Patents, Washington, D. C."